(12) United States Patent
Neet et al.

(10) Patent No.: US 7,919,892 B2
(45) Date of Patent: Apr. 5, 2011

(54) BRUSHLESS ELECTRIC MACHINE WITH STATIONARY SHAFT AND METHOD OF MAKING SAME

(75) Inventors: Kirk Neet, Pendleton, IN (US); Michael T. York, Whitmore Lake, MI (US)

(73) Assignee: Remy Technologies, L.L.C., Pendleton, IN (US)

( * ) Notice: Subject to any disclaimer, the term of this patent is extended or adjusted under 35 U.S.C. 154(b) by 421 days.

(21) Appl. No.: 11/772,323

(22) Filed: Jul. 2, 2007

(65) Prior Publication Data

US 2009/0009015 A1    Jan. 8, 2009

(51) Int. Cl.
*H02K 7/08* (2006.01)
(52) U.S. Cl. .......................................... 310/90; 310/263
(58) Field of Classification Search .................... 310/90, 310/263
See application file for complete search history.

(56) References Cited

U.S. PATENT DOCUMENTS

| 3,484,635 | A | * | 12/1969 | Mackallor | 310/266 |
| 6,166,461 | A | * | 12/2000 | Kusase et al. | 310/58 |
| 7,230,363 | B2 | * | 6/2007 | Stout et al. | 310/266 |
| 2001/0010437 | A1 | * | 8/2001 | Bolz et al. | 310/75 R |
| 2006/0038454 | A1 | * | 2/2006 | Bojiuc | 310/112 |

FOREIGN PATENT DOCUMENTS

| DE | 3915526 | * | 8/1990 |
| DE | 19617300 | * | 11/1997 |
| DE | 19903409 | * | 7/2000 |
| FR | 91198 | * | 4/1968 |
| FR | 70 14324 | * | 12/1971 |
| FR | 2609583 | * | 7/1988 |

* cited by examiner

*Primary Examiner* — Burton Mullins
(74) *Attorney, Agent, or Firm* — Cantor Colburn LLP

(57) ABSTRACT

Disclosed herein is an electric machine. The electric machine includes, a housing defining an internal volume, a stationary shaft fixedly attached to the housing, a stationary field coil attached to the shaft, a pole assembly rotatable about the shaft, and a pulley fixedly attached to the pole assembly being positioned externally of the internal volume.

13 Claims, 2 Drawing Sheets

BRUSHLESS ELECTRIC MACHINE WITH STATIONARY SHAFT AND METHOD OF MAKING SAME

BACKGROUND OF THE INVENTION

Many of the advantages that brushless electric machines such as alternators, for example, have over brush type alternators result from the use of a stationary field coil. An electric machine with a stationary field coil does not require sliding electrical contacts such as brushes and commutators. Having a stationary field coil, however, necessitates that pole segments, of pole pieces, rotate in close proximity to the stationary field coil. Typically the pole segments are positioned radially outwardly of the field coil and radially inwardly of a stator with small annular air gaps therebetween. Since a brushless alternator has no sliding contacts, current to the field coil is typically supplied through stationary conductors routed through an axial end of the machine to the field coil; typically this is the same axial end that structurally supports the field coil. In such a design the rotatable poles are fixedly attached to the shaft and the pole segments are cantilevered in the annular space between the field coil and the stator. This cantilevered attachment of the pole segments to the shaft is along an axial end of the shaft that is opposite the end from which the conductors are routed to the field coil.

The cantilevered poles, however, limit the rotational speed at which the alternator can rotate. This rotational speed limitation is partially due to radially outward flexing of the pole segments that results from the high centrifugal forces on the pole segments that occurs at high rotational speeds, which can result in undesirable contact of the flexed pole segments with the stator. Efforts to control such flexing usually add undesirable mass, and consequently, undesirable inertia to the rotational components of the assembly. As such, the industry would be receptive to brushless machines that overcome the foregoing deficiencies.

BRIEF DESCRIPTION OF THE INVENTION

Disclosed herein is an electric machine. The electric machine includes, a housing, a stationary shaft fixedly attached to the housing, a stationary field coil attached to the shaft, a pole assembly rotatable about the shaft, a first bearing and a second bearing both in operable communication with the shaft and the pole assembly and a third bearing in operable communication with the pole assembly and the housing.

Further disclosed herein is an electric machine. The electric machine includes, a housing defining an internal volume, a stationary shaft fixedly attached to the housing, a stationary field coil attached to the shaft, a pole assembly rotatable about the shaft, and a pulley fixedly attached to the pole assembly being positioned externally of the internal volume.

Further disclosed herein is a method of making an electric machine. The method includes, rotationally fixing a field coil to a shaft, rotationally fixing the shaft to a housing, and rotationally mounting a pole assembly to the shaft and the housing.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of several embodiments of the disclosed apparatus and method are presented herein by way of exemplification and not limitation with reference to the Figures.

Figure 1:
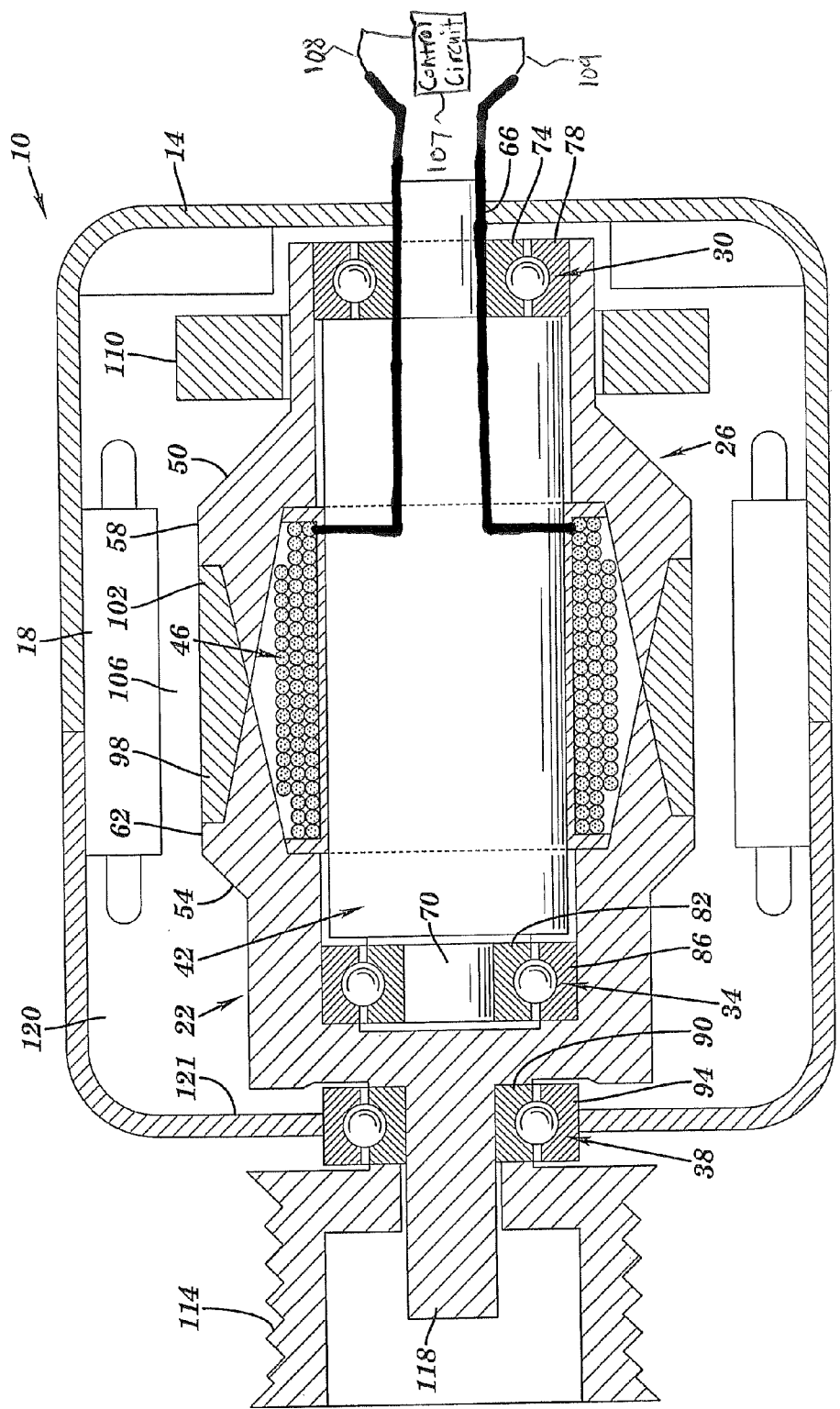
FIG. 1 depicts a cross sectional view of an alternator disclosed herein.

Referring to FIG. 1, the electric machine, disclosed herein as brushless alternator 10, is illustrated in cross section. Although described as an alternator, the electric machine disclosed herein may be any electric machine, such as a motor or starter-generator, for example. The brushless alternator 10 includes, a housing 14, a stator 18, a rotor 22, a pole assembly 26, and three bearings 30, 34, and 38. The rotor includes a stationary shaft 42 with a field coil 46 attached therearound. Unlike typical pole assemblies for brushless alternators, the pole assembly 26 disclosed herein is not cantilevered about a shaft and a field coil. Instead the pole assembly 26 has two pole pieces 50, 54 that are assembled axially from either end of the shaft 42. The pole pieces 50, 54 each include a plurality of pole segments 58, 62. The pole segment 58 extends axially toward the pole piece 54 while the pole segment 62 extends axially toward the pole piece 50. For even more stability, the pole segments 58 can be attached to the pole segments 62 to help structurally support one another and minimize any radial flexing being urged by centrifugal forces when the rotor 22 is rotating. As such, the pole assembly 26 can be made of smaller and less expensive materials while not requiring tolerances as tight as those usually needed in conventional brushless alternators.

These benefits are achieved by the novel construction of the brushless alternator 10, which is described in greater detail hereunder. The stationary shaft 42 is fixedly attached to the housing 14 at a first end 66 of the shaft 42 by an interference fit (shown), a set screw or similar methods that are known in the art. A second end 70 of the shaft 42, on an opposite axial end from the first end 66, is positioned within the housing 14. The first bearing 30 is functionally attached to the first end 66 while the second bearing 34 is functionally attached to the second end 70. The first bearing 30 and the second bearing 34 are also both functionally attached to the pole assembly 26. More specifically, the first bearing 30 has an inner race 74 fixedly attached to the shaft 42 at the first end 66 and an outer race 78 fixedly attached to the pole assembly 26. Similarly, the second bearing 34 has an inner race 82 fixedly attached to the shaft 42 at the second end 70 and an outer race 86 fixedly attached to the pole assembly 26. The third bearing 38 is functionally attached to both the pole assembly 26 and the housing 14 by an inner race 90 that is fixedly attached to the pole assembly 26 and an outer race 94 that is fixedly attached to the housing 14. The three bearings 30, 34, 38 typically will share a same longitudinal axis as does the rotor 22 and the pole assembly 26.

The foregoing structure, thereby, allows the pole assembly 26 to rotate concentrically about the stationary shaft 42 within the housing 14. The pole assembly 26, being rotationally supported by the three bearings 30, 34, 38, does not require a cantilevered portion. In fact, the pole assembly 26 can use the first pole piece 50 with the pole segments 58 having ends 98 and the second pole piece 54 with the pole segments 62 having ends 102 that are similar to claw shaped poles used on brush type alternators. As such, the ends 98 of the first pole segments 58 and the ends 102 of the second pole segments 62 flex under centrifugal loads a similar amount as the typical claw shaped poles of the brush type alternators. If desired, the ends 98 of the first pole segments 58 can be interlocked with the ends 102 of the second pole segments 62 thereby further minimizing flexing of the ends 98 and 102 radially outwardly due to centrifugal force acting thereon. This interlocking can be made by a non-magnetic ring (not shown), which is commonly known to those skilled in the art. The ring is located radially inwardly of the of the pole segments 58, 62 and may be welded to the pole segments 58, 62 as is typically done in a brushless type alternator. By interlocking the ends 98, 102 into the opposing pole pieces 50, 54 the pole segments 58, 62 can be made smaller and lighter and the bearings 30, 34, 38 can be smaller and lighter as well. Additionally, since the flexing of the pole segments 58, 62 is decreased the amount of clearance designed into an air gap 106 surrounding the pole segments 58, 62 can also be decreased. The reduced size alternator of this embodiment can generate similar power as conventional larger brushless alternators and as such can have a higher power density. The smaller, lighter and fewer (shaft 42 and field coil 46 are stationary) rotating components also result in less rotational inertia of the disclosed alternator 10 allowing for faster changes in rotational speed. Further, the decrease in flexing of the pole segments 58, 62 allow higher rotational speeds to be attained.

The speeds of the alternator are controlled in part by electronic commutation that can be performed by an electronic control circuit 107 located at the alternator 10. Control circuit 107 provides electric current to the field coil 46 that generates magnetic fields for the pole assembly 26. A pair of conductors 108 and 109 connecting the control circuit 107 to the field coil 46 are routed within the envelope of the shaft 42 and as such are routed radially inwardly of the inner race 74. Cooling of the control circuit, field coil 46 as well as the rest of the components within the alternator 10 can be facilitated by one or more fans 110 that can be attached to the pole assembly 26 to either or both pole pieces 50 (fan 110 is shown), 54 (fan is not shown).

Rotational energy is provided to the alternator 10 by an engine via a drive belt (not shown). The belt interfaces with belt grooves on a pulley 114 and rotates the pulley 114 that is fixedly attached to the rotor 22 by a protrusion 118 of the second pole piece 54 that extends through the inner race 90 of the third bearing 38. Thus, the pulley 114 is positioned externally of an internal volume 120 defined by the housing 14.

Figure 2:
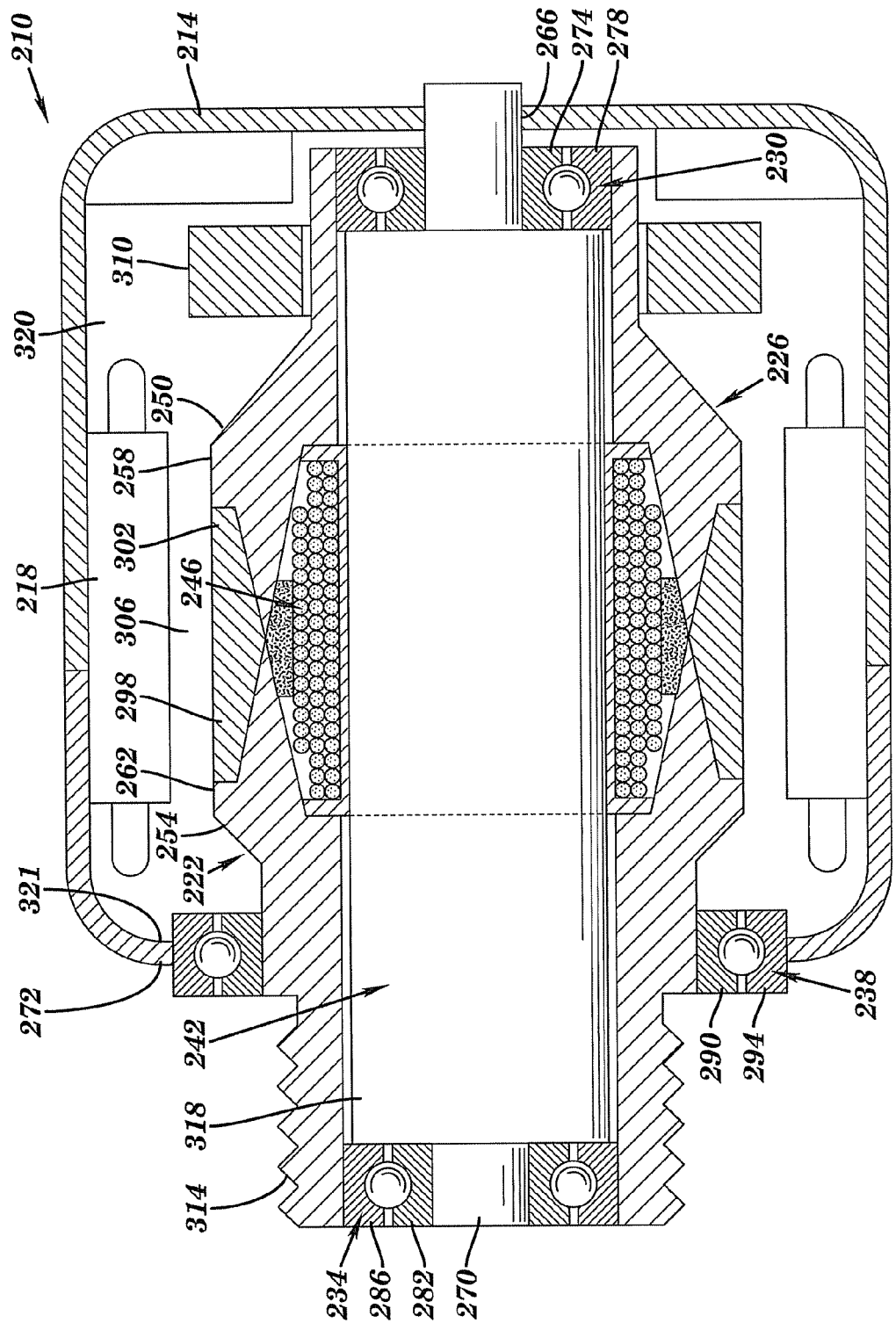
FIG. 2 depicts a cross sectional view of an alternate embodiment of the alternator disclosed herein.

Referring to FIG. 2, an alternate embodiment of the electric machine, disclosed herein as brushless alternator 210, is illustrated in cross section. The brushless alternator 210 includes, a housing 214, a stator 218, a rotor 222, a pole assembly 226, and three bearings 230, 234, and 238. The rotor includes a stationary shaft 242 with a field coil 246 attached therearound. Unlike typical pole assemblies for brushless alternators, the pole assembly 226 disclosed herein is not cantilevered about a shaft and a field coil. Instead the pole assembly 226 has two pole pieces 250, 254 that are assembled axially from either end of the shaft 242. The pole pieces 250, 254 each include a plurality of pole segments 258, 262 that extend axially toward the opposite pole piece 250, 254 from which they are attached. For even more stability, the pole segments 258 can be attached to the pole segments 262 to help structurally support one another and minimize any radial flexing being urged by centrifugal forces when the rotor 222 is rotating. As such, the pole assembly 226 can be made of smaller and less expensive materials while not requiring tolerances as tight as those usually needed in conventional brushless alternators.

These benefits are achieved by the novel construction of the brushless alternator 210, which is described in greater detail here. The stationary shaft 242 is fixedly attached to the housing 214 at a first end 266 of the shaft 242 by an interference fit (shown), a set screw or similar methods that are known in the art. In this embodiment, a second end 270 of the shaft 242, on an opposite axial end from the first end 266, is positioned beyond an axial end 272 of the housing 214. The first bearing 230 is functionally attached to the first end 266 while the second bearing 234 is functionally attached to the second end 270. The first bearing 230 and the second bearing 234 are also both functionally attached to the pole assembly 226. More specifically, the first bearing 230 has an inner race 274 fixedly attached to the shaft 242 at the first end 266 and an outer race 278 fixedly attached to the pole assembly 226. Similarly, the second bearing 234 has an inner race 282 fixedly attached to the shaft 242 at the second end 270 and an outer race 286 fixedly attached to the pole assembly 226. The third bearing 238 is functionally attached to both the pole assembly 226 and the housing 214 by an inner race 290 that is fixedly attached to the pole assembly 226 and an outer race 294 that is fixedly attached to the housing 214. The three bearings 230, 234, 238 typically will share a same longitudinal axis as does the rotor 222 and the pole assembly 226.

The foregoing structure, thereby, allows the pole assembly 226 to rotate concentrically about the stationary shaft 242 within the housing 214. The pole assembly 226, being rotationally supported by the three bearings 230, 234, 238, does not require a cantilevered portion. In fact, the pole assembly 226 can use the first pole piece 250 with the pole segments 258 having ends 298 and the second pole piece 254 with the pole segments 262 having ends 302 that are similar to claw shaped poles used on brush type alternators. As such, the ends 98 of the first pole segments 58 and the ends 102 of the second pole segments 62 flex under centrifugal loads a similar amount as a typical claw shaped poles of brush type alternators. If desired, the ends 298 of the first pole segments 258 can be interlocked with the ends 302 of the second pole segments 262 thereby further minimizing flexing of the ends 298 and 302 radially outwardly due to centrifugal force acting thereon. This interlocking can be made by a non-magnetic ring (not shown), which is commonly known to those skilled in the art. The ring is located radially inwardly of the of the pole segments 58, 62 and may be welded to the pole segments 58, 62 as is typically done in a brushless type alternator. By interlocking the ends 298, 302 into the opposing pole pieces 250, 254 the pole segments 258, 262 can be made smaller and lighter and the bearings 230, 234, 238 can be smaller and lighter as well. Additionally, since the flexing of the pole segments 258, 262 is decreased the amount of clearance designed into an air gap 306 surrounding the pole segments 258, 262 can also be decreased. The reduced size alternator of this embodiment can generate similar power as conventional larger brushless alternators and as such can have a higher power density. The smaller, lighter and fewer (shaft 42 and field coil 46 are stationary) rotating components also result in less rotational inertia of the disclosed alternator 210 allowing for faster changes in rotational speed. Further, the decrease in flexing of the pole segments 258, 262 allow higher rotational speeds to be attained.

The speeds of the alternator are controlled in part by electronic commutation that can be performed by an electronic control circuit (not shown) located at the alternator 210. The control circuit provides electric current to the field coil 246 that generates magnetic fields for the pole assembly 226. A pair of conductors (not shown) connecting the control circuit to the field coil 246 are routed within an envelope of the shaft 242 and as such are routed radially inwardly of the inner race 274. Cooling of the control circuit, field coil 246 as well as the rest of the components within the alternator 210 can be facilitated by one or more fans 310 that can be attached to the pole assembly 226, for example, to either or both pole pieces 250 (fan 310 is shown), 254 (fan is not shown).

Rotational energy is provided to the alternator 210 by an engine via a drive belt (not shown). The belt interfaces with belt grooves on the pulley 314 and rotates the pulley 314 that is fixedly attached to the rotor 222 by a protrusion 318 of the second pole piece 254 that extends through the inner race 290 of the third bearing 238. Thus, the pulley 314 is positioned externally of an internal volume 320 defined by the housing 214.

The alternator 10 is different from the alternator 210 in that the pulley 114 is a separate member from the second pole piece 54 or pole assembly 26 and, therefore, is detachable so that it can be easily changed in the field. The alternators 10 and 210 both have an advantage over some typical brushless alternators in that the pulleys 114, 314 are external to the internal volumes 120, 320 defined by the housings 14, 214. The word internal volume 120, 320, in this case, is defined as a volume contained within the housings 14, 214. The internal volumes 120, 320 are partially bounded by an imaginary plane defined by inner surfaces 121, 321 of the respective housings 120, 320.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine, comprising:
    a housing;
    a stationary shaft fixedly attached to the housing;
    a stationary field coil attached to the shaft;
    a pole assembly rotatable about the shaft, the pole assembly including a first pole piece operatively coupled to the second pole piece;
    a first bearing in operable communication with the shaft and the pole assembly;
    a second bearing in operable communication with the shaft and the pole assembly; and
    a third bearing in operable communication with the pole assembly and the housing.

2. The electric machine of claim 1, wherein the first bearing is located at a first end of the shaft and the second bearing being located at a second end of the shaft, the first end being located at an end of the shaft that is opposite the second end.

3. The electric machine of claim 1, wherein the first bearing, the second bearing and the third bearing all share a common axis.

4. The electric machine of claim 1, further comprising at least one fan attached to the pole assembly.

5. The electric machine of claim 1, wherein the first bearing is in operable communication with the first pole piece and the shaft.

6. The electric machine of claim 1, wherein the second bearing is in operable communication with the second pole piece and the shaft.

7. The electric machine of claim 1, wherein the third bearing is in operable communication with the second pole piece and the housing.

8. The electric machine of claim 1, wherein pole segments of the first pole piece are attached to pole segments of the second pole piece to minimize radially flexing thereof.

9. The electric machine of claim 1, further comprising a pulley fixedly attached to the pole assembly.

10. The electric machine of claim 1, further comprising at least one conductor in operable communication with the stationary field coil, the at least one conductor routed axially across the first bearing radially inwardly of an inner race of the first bearing.

11. The electric machine of claim 1, wherein the electric machine is brushless.

12. The electric machine of claim 1, wherein the electric machine is an alternator.

13. The electric machine of claim 1, further comprising a stator fixedly attached to the housing.

\* \* \* \* \*